United States Patent [19]

Goto

[11] Patent Number: 5,418,596

[45] Date of Patent: May 23, 1995

[54] PHOTOMETRY APPARATUS IN A CAMERA

[75] Inventor: Tetsuro Goto, Funabashi, Japan

[73] Assignee: Nikon Corporation, Tokyo, Japan

[21] Appl. No.: 141,979

[22] Filed: Oct. 28, 1993

[30] Foreign Application Priority Data

Oct. 28, 1992 [JP] Japan .................................. 4-289162
Dec. 8, 1992 [JP] Japan .................................. 4-351622

[51] Int. Cl.⁶ ...................... G03B 13/36; G03B 15/03; G03B 7/08
[52] U.S. Cl. ................................... 354/403; 354/432; 354/415
[58] Field of Search ............... 354/429, 413, 412, 402, 354/432, 410, 416, 415, 195.12, 403

[56] References Cited

U.S. PATENT DOCUMENTS

| 3,601,022 | 8/1971 | Langnau | 354/413 |
| 4,690,538 | 9/1987 | Matsui et al. | 354/403 |
| 4,782,357 | 11/1988 | Hayakawa et al. | 354/432 X |
| 4,984,005 | 1/1991 | Kazami et al. | 354/412 |
| 4,984,006 | 1/1991 | Ikemura et al. | 354/432 X |
| 5,023,649 | 6/1991 | Hayashi et al. | 354/434 |
| 5,115,269 | 5/1992 | Masanaga et al. | 354/429 X |
| 5,231,447 | 7/1993 | Takagi | 354/415 |
| 5,268,730 | 12/1993 | Takagi | 354/432 X |

FOREIGN PATENT DOCUMENTS 4-215631 8/1992 Japan .
4-251230 9/1992 Japan .

Primary Examiner—W. B. Perkey

[57] ABSTRACT

An apparatus for performing photometry on a photographic subject image divided into plural regions, which eliminates the negative effects on photometry caused by an illumination source which provides auxiliary lighting. The illumination source for providing auxiliary lighting illuminates a portion of the photographic subject. When it is detected that photometry is being performed, illumination by the illumination source may be inhibited such that the brightness of the subject does not suddenly change, thereby adversely effecting photometry. Conversely, when the commencement of the action of the illumination source is detected, photometry may be inhibited such that the change in brightness due to the illumination source has no effect on the photometry. When a portion of the photographic subject has been illuminated by the illumination source during photometry this situation is detected, and the photometric result is corrected to compensate for the effect of the illumination source on photometry.

15 Claims, 10 Drawing Sheets

PHOTOMETRY APPARATUS IN A CAMERA

BACKGROUND OF THE INVENTION

1. Field of the Invention

The present invention relates to a photometric device in a camera equipped with an illumination source for generating auxiliary light in order to facilitate focus detection, and more particularly, it relates to a device for preventing the improper determination of suitable exposure conditions due to the illumination by the auxiliary light.

2. Description of the Related Art

Photometric devices are known which measure the brightness of a subject in order to perform appropriate exposure. According to the known photometric devices, a brightness value is photometrically obtained, and processing circuits in the camera determine a shutter speed and a stop value such that an appropriate exposure value for the film is determined.

The known types of photometric devices generally place emphasis in measurement on only the central portion of the image of the photometric subject. However, more recently, a method termed "divided brightness measurement" has been used to make photometric measurements wherein separate photometric measurements are made of plural portions of the photographic subject image. According to this method, an image of the photographic subject is divided into a total of five segments, including a center segment and plural peripheral segments. Photometry is performed on respective segments, and, taking into consideration the state of brightness of the principal segment and the peripheral segments, an optimum exposure condition is determined. When performing divided brightness measurement, the brightness distribution can be determined within each of the principal segment and the peripheral segments, and it becomes possible to increase the accuracy rate in determining exposure conditions. It is believed that in the future, due to improvements in light receiving elements, from tens to hundreds of divided photometric measurement regions will be possible.

Cameras having the above-described types of high performance photometric devices use built-in illumination sources in order to illuminate a subject to increase the performance of the photometric devices. For example, when a subject is dark, in order to assist in the operation of a rangefinder sensor, it is known to illuminate the subject temporarily with auxiliary light from a spotlight. Furthermore, it is also known to illuminate the subject with auxiliary light in order to prevent the "red-eye" effect.

However, in cameras equipped with a divided photometric device for divided brightness measurement and an illumination source to provide auxiliary lighting, the output of the photometric device may be affected by the auxiliary lighting. Specifically, when the divided photometric device includes a small number of segments, because each segment is relatively large in comparison with the region illuminated by the illumination source, the auxiliary light has a very small effect on the value of the photometric output. Therefore, performing exposure value calculations using the unchanged photometric output signal corresponding to each segment gives rise to only negligible error.

When the number of segments in the divided photometric device reaches tens or hundreds and the size of each segment becomes smaller, the size of the segments and the size of the region illuminated by the auxiliary light become very close. When the surface area of the photometric region corresponding to one picture element becomes narrower than the radiation region of the auxiliary light, there are effects on the photometric output value and on the exposure conditions determined from the photometric output value. For example, the problem arises that, with a true subject consisting of a point light source, a portion of the subject is illuminated solely with auxiliary light and the essentially dark subject appears bright, thereby making it impossible to distinguish the difference between the subject and the point light source, which is recognized as an error. Therefore, appropriate exposure conditions cannot be successfully obtained.

SUMMARY OF THE INVENTION

Therefore, it is an object of the present invention to provide a photometric device for a camera equipped with an illumination source which shines light on a portion of a subject, so that even if auxiliary light illuminates the subject it exerts no adverse effect on the photometric output value such that suitable exposure conditions may be determined.

It is a further object of the present invention to provide a photometric device for a camera which detects whether an illumination source is providing auxiliary light to a subject and prevents the photometric device from performing photometry if illumination is being provided.

It is yet a further object of the present invention to provide a photometric device for a camera which detects whether the photometric device is performing photometry, and prevents an illumination source from illuminating a subject when photometry is detected.

It is still a further object of the present invention to provide a photometric device for a camera which detects whether both photometry and illumination of a subject are performed simultaneously, and corrects a photometric output of the photometric device according to the amount of illumination of the subject.

Additional objects and advantages of the invention will be set forth in part in the description which follows, and, in part, will be obvious from the description, or may be learned by practice of the invention.

The above objects are achieved by providing a camera equipped with an a photometric unit having a plurality of segments to perform divided brightness measurement, wherein separate photometric measurement is performed for respective segments into which a subject image on a focal plane has been divided. The camera includes an illumination source which shines light on a portion of a photographic subject in order to assist, e.g., in rangefinding operations. A detection device detects when photometric measurement is being performed, and inhibits the illumination source from illuminating the subject when photometric measurement is being performed. As a result of inhibiting illumination during photometry, the brightness of the subject does not suddenly change, and there are no adverse effects on the photometric measurements.

The objects of the present invention may also be achieved in a camera having a photometric unit, an illumination source, and a detection device which detects when the illumination source illuminates a portion of the photometric subject. When illumination of the subject is detected, photometry by the photometric unit is inhibited. Accordingly, the change of the brightness of the subject due to illumination has no effect on photometry.

Further, the above objects of the present invention may be achieved through a camera equipped with the photometric unit for performing photometry on a photographic image divided into plural regions, and an illumination source to illuminate a portion of a photographic subject wherein an illumination detection device detects whether or not illuminating light is shining from the illumination source during photometry. A correction device corrects the output of the photometric unit in accordance with the output of the illumination detection device.

When the illumination detection device detects that the illuminating light is shining from the illumination source during action of the photometric unit, the correction device corrects the output of the photometric unit. Exposure conditions are then calculated using the corrected photometric output. When the illumination detection device does not detect that the illuminating light is shining from the illumination source during action of the photometric unit, the calculation of exposure conditions is performed using the unchanged output of the photometric unit. Accordingly, even if auxiliary light is used to facilitate focus detection for the camera, or auxiliary light is used with the object of preventing red-eye phenomenon, and the auxiliary light shines during the action of the photometric unit, no adverse influence is exerted on the determination of suitable exposure conditions.

Furthermore, when the distance from the camera to the subject changes, the size of the region illuminated by the illumination source changes. The intensity of the light illuminated on the subject by the illuminating source also changes. Therefore, in order to achieve the above objects of the present invention, the content of the correction by means of the correction unit is adjusted (e.g., the correction region and/or the amount of correction) according to the distance from the camera to the subject. The influence of the auxiliary light is thereby minimized. Since the influence on the photometric signals due to the auxiliary light changes with the zoom ratio of the photographic lens, the content of the correction by means of the correction unit (e.g., by adjustment of the correction region and/or the amount correction) minimizes the influence of the auxiliary light on the photometric signal.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 1:
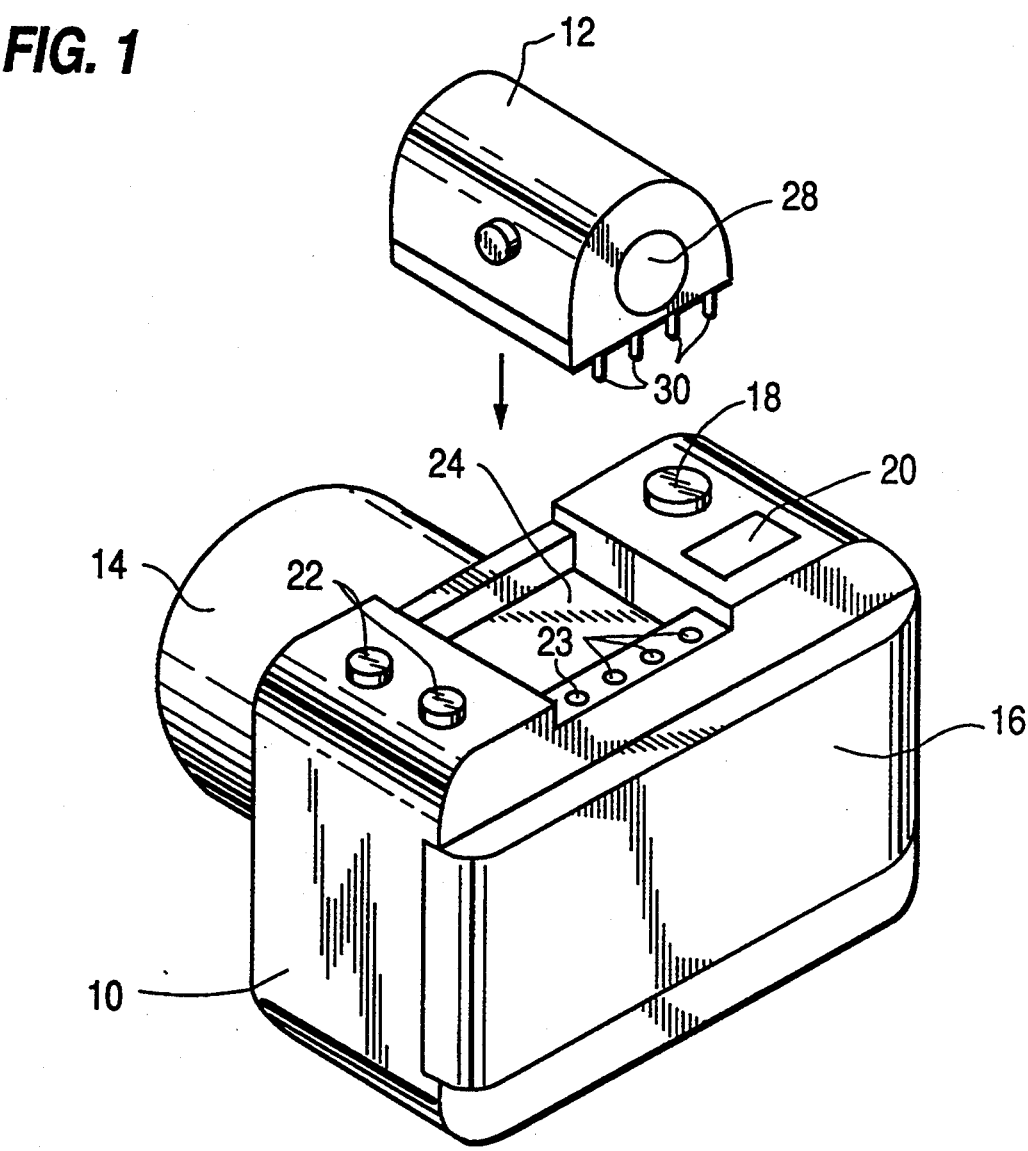
FIG. 1 is an oblique view showing the external appearance of a camera in accordance with the preferred embodiments of the present invention.

FIG. 1 is an oblique view showing the external appearance of a camera with a built-in photometric device in accordance with a preferred embodiment of the present invention. As seen in FIG. 1, a viewfinder 12, a lens 14, and a back cover 16 are all arranged freely detachable on the camera body 10. More specifically, the viewfinder 12 is detachable with respect to a screen portion 24; the lens 14 is detachable with respect to a body mount (not shown); and, the back cover 16 is detachable with respect to a film receiving portion (not shown). The back cover 16 is also constructed such that it may be opened and closed by means of a hinge (not shown). Further, light from a subject which has passed through the lens 14 is projected on the screen 24.

A shutter button 18 is located on the front right hand side of the upper portion of the camera body 10, and setting buttons 22 are arranged on the left hand side of the upper portion of the camera body 10. A display 20 is located on the rear right hand side of the upper portion of the camera body 10. The display 20 may be an LCD type display or the like. The shutter button 18 has two stages of depression. When the shutter button 18 is half depressed, a supply of electricity is sent to circuits within the camera body, and a half depression switch (not shown) is set ON. When the shutter button 18 is fully depressed, a release switch (not shown) is set ON in order to begin a photographic operation.

A group of concave-shaped contact points 26 are located on the screen portion 24 in a position at the rear side of the camera body 10. An eyepiece portion 28 is arranged on the viewfinder 12 in order to enable a photographer to view a subject. A convex-shaped contact group 30 is also arranged on the viewfinder 12. The convex-shaped group of contacts 30 fit into the concave-shaped group of contact points 26 located in the screen 24 in order to attach the viewfinder 12 to the camera body 10. Further, signals are sent and received between the camera body 10 and the viewfinder 12 by means of the convex-shaped contact group 30 and the corresponding group of concave-shaped contact points 26

Figure 2:
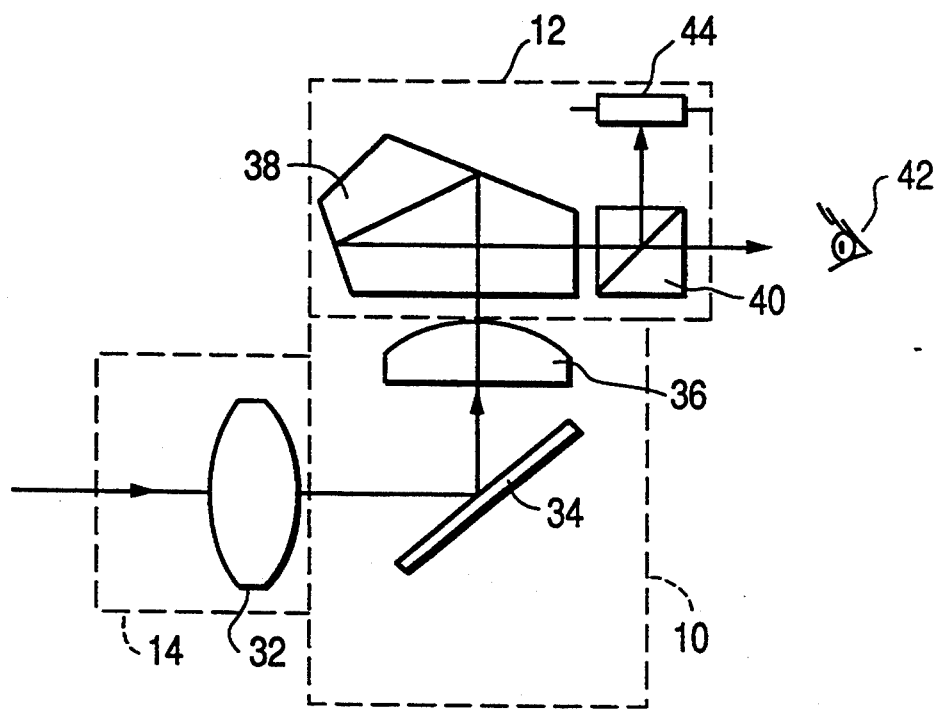
FIG. 2 is a schematic diagram showing an optical system and an internal optical path in a camera in accordance with the preferred embodiments of the present invention.

FIG. 2 is a schematic diagram showing an example of an optical system employed in the preferred embodiment of the present invention, and the internal optical path of light from a subject as it passes through the optical system in accordance with the preferred embodiments of the present invention. The optical system is located in the camera body 10, the viewfinder 12, and the lens 14. As seen in FIG. 2, light from a subject, indicated by the arrows in the figure, passes through a lens optical system 32 in the lens 14 and is reflected upwards by a reflecting mirror 34. The light reflected from the mirror 34 is imaged on a screen 36, and the subject image on the screen 36 is then reflected two times by a pentaprism 38 and projected towards a half-mirror 40. Part of the subject image light passes through the half-mirror 40 and enters the photographer's eye 42. Another part of the subject image light is reflected upwards by the half-mirror 40 and is incident on a light receiving surface of a two-dimensional sensor 44 (referred to below as a "light receiving sensor"). The light receiving sensor 44 may be any one of a number of known types of light receiving sensors, such as charge coupled devices (CCDs), wherein the subject brightness is divided into plural regions for photometry, and photometric signals corresponding to each region are output. As described in greater detail below, optimum exposure conditions are determined based upon both the photometric signals corresponding to respective regions of the light receiving sensor 44, and upon signals representing the sensitivity of the film used.

Figure 3:
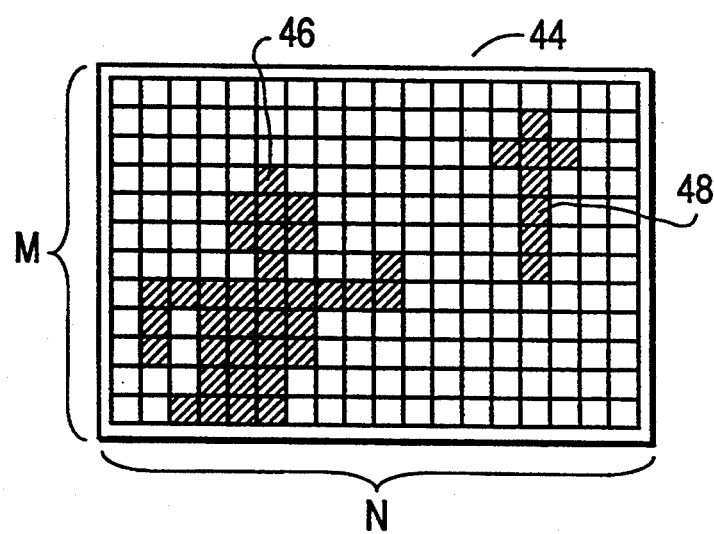
FIG. 3 is a diagram of a matrix light receiving sensor showing an example of a photometric result obtained by the sensor in accordance with the preferred embodiments of the present invention.

FIG. 3 is a diagram showing an example of recognition of a subject image in the light receiving sensor 44 having plural photometric regions in accordance with the preferred embodiments of the present invention. The shaded portions in FIG. 3 represent a subject image 46 and 48, and show a state when light is received on a portion of the photometric regions. The light receiving sensor 44 includes charged coupled elements (e.g., CCDs) and is formed as a matrix having M rows and N columns, or M×N divided regions. When light is received from a subject image on the above-described portions of the photometric regions, signals representing a photometric output are read from the light receiving sensor 44 in time sequence according to predetermined clock signals. The signals read out from the light receiving sensor 44 corresponding to the subject image are output to CPU 50 and stored in memory 54, as shown in FIG. 4.

Figure 4:
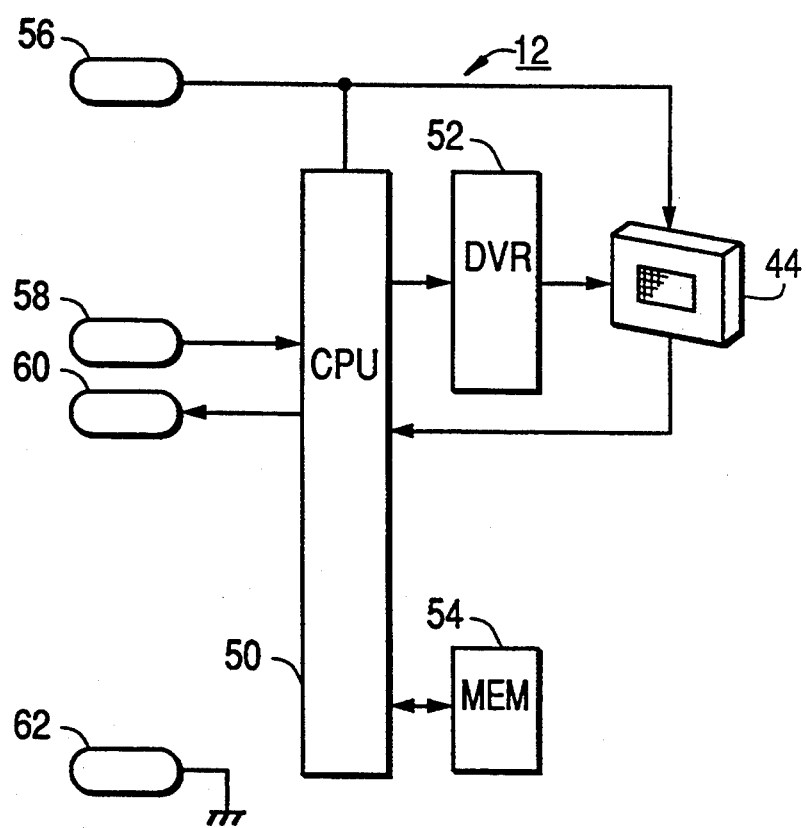
FIG. 4 is a block diagram showing control circuitry in the interior of the viewfinder of the camera in accordance with the preferred embodiments of the present invention.

FIG. 4 is a block diagram showing a control circuit disposed in the interior of the viewfinder 12 in accordance with the preferred embodiments of the present invention. The control circuit includes a CPU 50, a drive circuit 52 ("DVR") and a memory circuit 54. Contact points 56, 58, 60 and 62 correspond to the contact points generally referred to by reference character 30 in FIG. 1, and are used to send signals to and receive signals from the camera body 10. Contact points 56, 58 and 60 are connected to the CPU 50, and contact point 62 is a ground contact within the viewfinder 12.

The CPU 50 drives the light receiving sensor 44 via the drive circuit 52. The sensor 44 measures the brightness of a subject, and resulting subject image signals are received from the sensor 44 by the CPU 50. The subject image signals are stored in the memory 54, and when necessary for calculating suitable exposure conditions, etc., the subject image signals are read out from memory 54. More specially, in order to calculate suitable exposure conditions, a film sensitivity signal is sent from the camera body 10, via the group of contacts 26 to contact point 58, and, based upon the above-described subject image signals and the film sensitivity signal, the CPU 50 calculates the optimum exposure conditions. An appropriate exposure signal is output to the camera body 10, via the contact point 60, which represents the calculated optimum exposure conditions.

Figure 5:
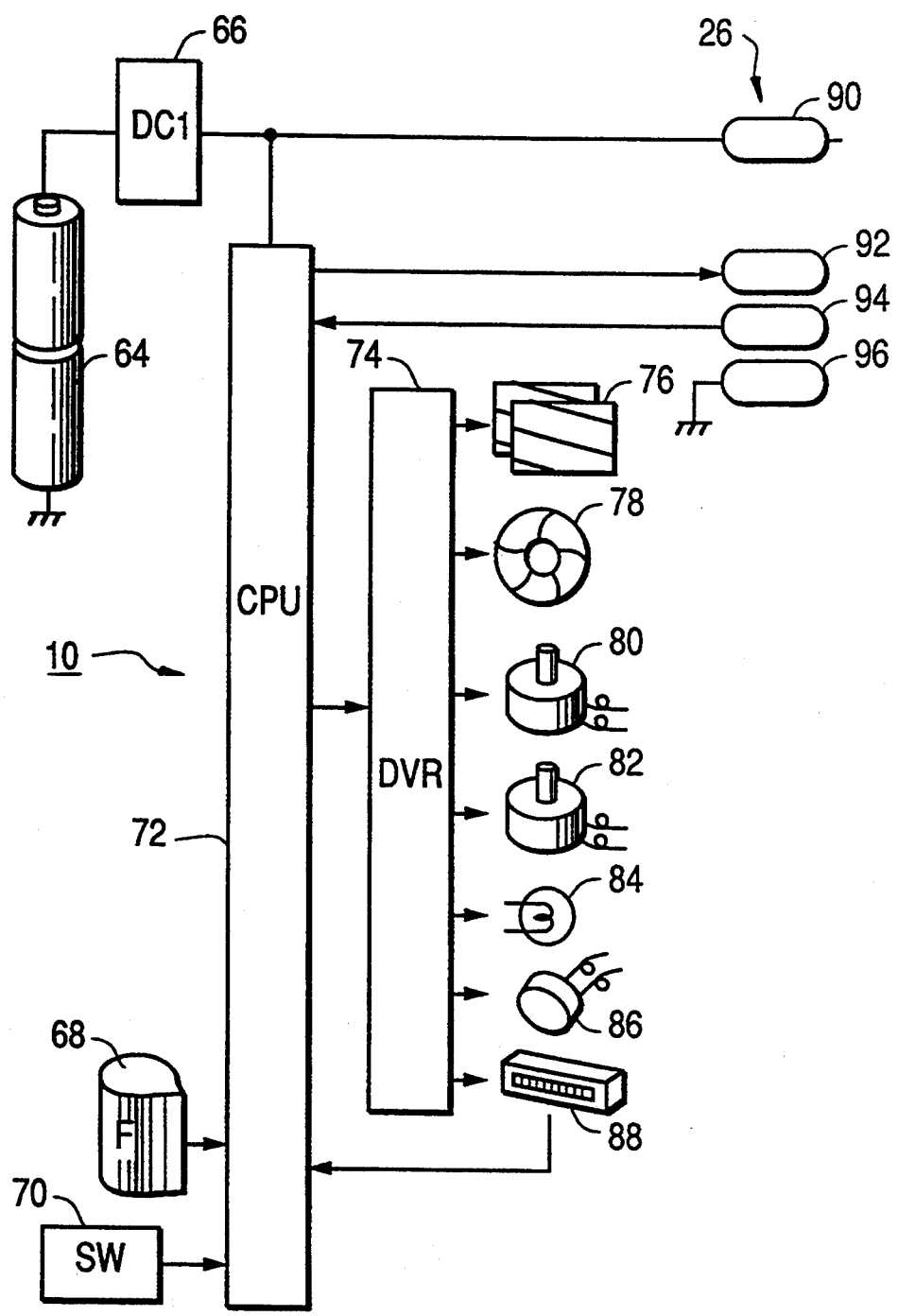
FIG. 5 is a block diagram showing control circuitry in the camera in accordance with the preferred embodiments of the present invention.

FIG. 5 is a block diagram showing a control circuit disposed within the camera body 10 in accordance with the preferred embodiments of the present invention. The control circuit of FIG. 5 includes a battery 64 for supplying power, a DC-DC converter "(DC)" 66, a film sensitivity detection circuit "(F)" 68, a switch group ("SW") 70, a CPU 72, and drive circuits ("DVR") 74 for driving various elements. More specifically, the drive circuits 74 drive a shutter 76, a stop 78, motors 80 and 82, illuminating lamp 84, an auxiliary light source 86, a focus detection element 88, and the like. A group of contact points 90, 92, 94 and 96 are provided which correspond to the contact group 26 (FIG. 1) on the camera body 10, and which send signals to and receive signals from the viewfinder 12. Three of the contact points 90, 92 and 94 connect to the CPU 72, and contact point 96 is a ground contact connected to ground within the camera body 10.

The battery 64, via DC-DC converter 66, supplies electricity, e.g., at 5 volts, to all the circuits in the camera body 10, and, supplies electricity to circuits within the viewfinder 12, via contact point 90. Further, circuits within the back cover 16 are electrically supplied from the DC-DC converter 66; however, the contact points for this purpose are not shown in the drawings.

The CPU 72 performs control of all the camera operations. The CPU 72 receives a signal indicating film sensitivity from the film sensitivity detection circuit 68, and also receives signals from various switches in the switch group 70. For example, instructions or state signals are input via the switch group 70 from the shutter button 18 or the selection buttons 22 (FIG. 1), or signals from a sequence switch (not shown) and the like are input. Further, state signals indicating focus agreement from the focus detection element 88 are also input to the CPU 72. Signals indicating suitable photographic conditions are input to CPU 72 from the CPU 50 in the viewfinder 12, via contact point 60 (FIG. 4) and contact point 94. Signals relating to the appropriate exposure conditions are input from the viewfinder 12 via contact 94.

Signals for controlling the various elements 76–88 are output from the CPU 72 as described below. Specifically, signals are output from CPU 72, via the drive circuit 74, for controlling the opening and closing of the shutter 76 during exposure and, signals are output to control setting the stop member 78 to predetermined values limiting the light from a subject. Signals are output via drive 74 for controlling the ON or OFF state of motor 80 for winding or rewinding the film, and for controlling the ON or OFF state of motor 82 for focusing the lens 14. The CPU 72 also outputs signals via the drive circuit 74 to control an illuminating lamp 84 to assist in focus detection by shining light in a predetermined pattern on the subject during low brightness, and signals are output to control lighting of an auxiliary light source 86 in order to close the subject's pupils thereby mitigating the so-called red-eye phenomenon. The illuminating lamp 84 may illuminate the subject with either visible light or non-visible light such as infrared (IR) light from an infrared light source. Also, signals are output from CPU 72 via driver 74 to control the focus detection element 88. Further, the display 20 of FIG. 1 is also driven by the CPU 72. Film sensitivity signals are also sent to the viewfinder 12, via the contact point 92.

Figure 6:
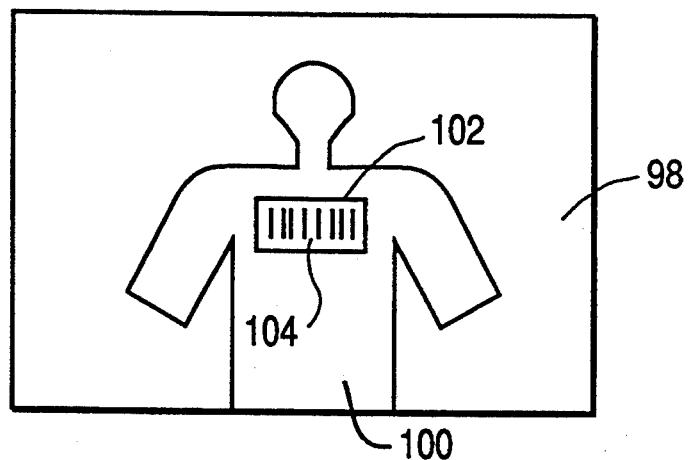
FIG. 6 is a diagram showing the relationship between a region illuminated by auxiliary light and a focus detection region for a subject in accordance with the preferred embodiments of the present invention.

FIG. 6 is a diagram showing the relationship between the regions illuminated by the auxiliary light from the illumination lamp 84, and the focus detection region in accordance with the preferred embodiments of the present invention. Specifically, FIG. 6 shows a photographic field 98 during focus detection, wherein a subject 100 is, for example, in the position shown in the figure. The focus detection element 88 (FIG. 5) measures distance by monitoring the photographic field 98 at a region 102 shown in the center portion of the photographic field 98.

When the brightness of the subject 100 is low, such that the level of brightness is below a rangefinding limit of the focus detection element 88, the illumination lamp 84 lights up, and light in a predetermined pattern 104 shines on a detection portion. The auxiliary light returning from the subject 100 is received by the focus detection element 88, and the subject distance is determined. This type of rangefinding operation is well known.

Figure 7:
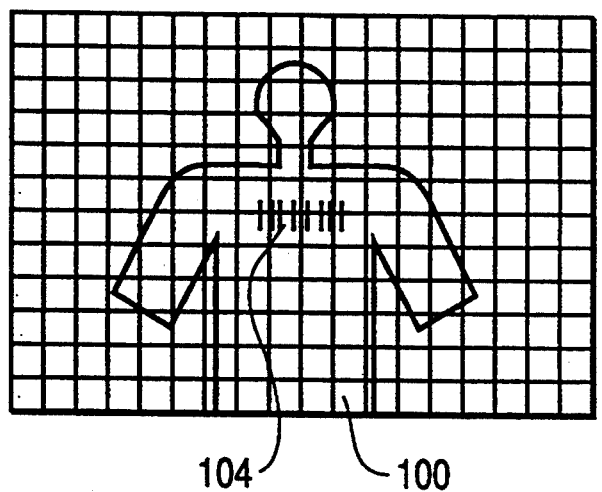
FIG. 7 is a diagram showing the relationship between the divided photometric regions and the auxiliary light illumination region in accordance with the preferred embodiments of the present invention.

FIG. 7 is a diagram showing the state of the light receiving surface of the light receiving sensor 44 when the subject image 100 has been illuminated as described above with reference to FIG. 6. The sensor 44, as described above with respect to FIG. 3, measures light in respective regions divided into M rows×N columns while the section 102 of the photographic subject 100 is illuminated with a pattern of light 104 by means of the illuminating lamp 84. The sensor 44 detects the subject image 100 including the pattern 104.

The M×N sensor 44 is divided such that the size of the portion 102 illuminated by the pattern of light 104 generated by the illuminating lamp 84 in each region of the M×N sensor 44 is similar to the size of each picture element. The signal output of the picture elements illuminated by auxiliary light from the illumination lamp 84 receives a very large effect in comparison with the true photometric signal. Specifically, the photometric regions illuminated with auxiliary light are of very high brightness and erroneous recognition results.

Furthermore, there is an approximately fixed positional relationship between the picture elements for which there is a possibility of receiving an effect due to illumination with the pattern of light 104 from the illuminating lamp 84, which is unrelated to the lens 14 (FIG. 1) used. However, the intensity of the auxiliary light from the illuminating lamp 84 becomes rather weak when the subject is far from the camera. Additionally, the size of the region 102 illuminated with a pattern of light 104 changes according to the distance between the camera and the subject.

The processes which will be described below in detail with reference to the flowcharts of FIGS. 8–12 control the camera to eliminate the influence of the auxiliary light from the illuminating lamp 84 on photometric results from the divided light receiving sensor 44.

Figure 8:
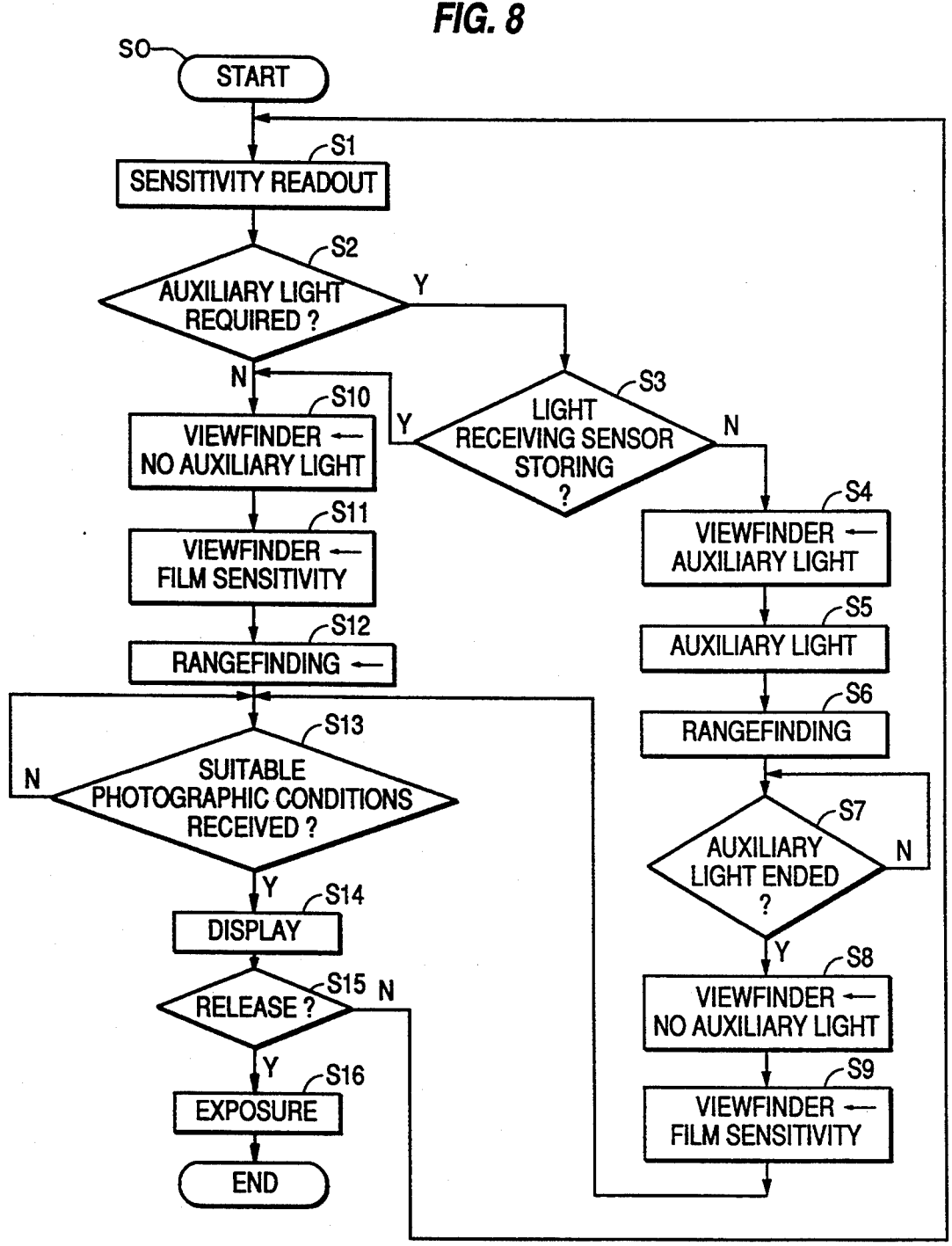
FIG. 8 is a flowchart showing an example of a control routine for controlling exposure in a camera having auxiliary lighting of a subject in accordance with a first embodiment of the present invention.

FIG. 8 is a flowchart showing an example of a control routine for controlling exposure in a camera having auxiliary lighting according to a first preferred embodiment of the present invention. The routine is executed by the CPU 72 located in the camera body 10. First, the power supply of the camera is turned ON, and by starting the DC-DC converter 66 the battery 64 supplies current to the CPU 72, thereby powering up the CPU 72. The control routine starts in step S0 when a release button (not shown) is half-depressed, the half-depression switch is set ON, and a half-depression signal is output by the switch group 70 to the CPU 72.

In step S1, the CPU 72 detects the film sensitivity which is either loaded from the film sensitivity detection circuit 68, or the film sensitivity may be set. Next, in step S2, it is determined whether or not auxiliary lighting from the illumination lamp 84 is necessary. This decision is determined, for example, according to the level of a rangefinding signal from the focus detection element 88. When the level of the rangefinding signal is smaller than a predetermined level, it is determined that lighting of the illumination lamp 84 is necessary, and the control routine proceeds to step S3. However, when the level of the rangefinding signal is larger than the predetermined level, it is determined that it is not necessary to light the lamp 84 and control proceeds to step S10. When it has been determined in step S2 that auxiliary lighting is required, in step S3, a signal is sent from the CPU 50 in the viewfinder 12 in order to determine whether the light receiving sensor 44 is storing. When it is determined that the light receiving sensor 44 is storing, the illumination from the illumination lamp 84 is not provided, and control proceeds to step S10. However, when the light receiving sensor 44 is not storing, the program proceeds to step S4.

In step S4, a signal denoting instructions to illuminate with auxiliary light is sent to the CPU 50 of the viewfinder 12, via contact points 92 and 58. Continuing in step S5, an instruction signal to light the illuminating lamp 84 is output via drive circuit 74 which lights the illuminating lamp 84 causing auxiliary light to illuminate the photographic subject 100 (FIG. 6). The auxiliary light which illuminates the photographic subject 100 is reflected by the subject 100 and is received by the focus detection element 88 (FIG. 5), and rangefinding is performed in step S6 in accordance with the output of the focus detection element 88. More specifically, the distance to the subject 100 is measured, and the amount of movement required to focus the lens 14 is determined, and the determined amount of movement is stored in memory.

Proceeding to step S7, it is determined whether the illumination by the illuminating lamp 84 has ended. While the rangefinding in step S6 is in progress, illumination by the illuminating lamp 84 has not yet ended, and the control routine waits until the rangefinding ends. While the control routine is waiting until rangefinding ends, the end of illumination by the auxiliary light 84 is not reported, via contact points 92 and 58, to viewfinder 12, and the viewfinder 12 does not perform photometry.

However, when the rangefinding operation performed in step S6 has ended, an instruction signal to extinguish the illuminating lamp 84 is output via the drive circuit 74, and the illuminating lamp 84 is extinguished. When the illuminating lamp 84 is extinguished, the pattern 104 formed on the photographic subject 100 is also extinguished, and control proceeds to step S8 where a signal denoting the completion of illumination by the illuminating lamp 84 is transmitted via contact points 92 and 58 to the CPU 50 of the viewfinder 12.

Next, in step S9, the stored signal corresponding to the film sensitivity is transmitted to the viewfinder 12. The CPU 50 of the viewfinder 12 receives photometric signals from the light receiving sensor 44 (as will be described in detail below) and calculates suitable photographic conditions based upon respective photometric output values and the film sensitivity. After the signal indicating film sensitivity has been transmitted to the viewfinder 12, control proceeds to step S13 where the control routine waits until signals corresponding to suitable photographic conditions have been received from the viewfinder 12. When these signals are received, control proceeds to step S14 and, e.g., the shutter speed, the stop value and the like are displayed on the display 20 (FIG. 1 ). Continuing in step S15, it is determined whether the release button has been fully depressed based upon an output from the switch group 70. When it is determined that the release button has not been fully depressed, and the release button remains only half-depressed, control returns to step S1. However, when the half-depression continues and the release button is then fully depressed, a full-depression signal is output from the switch group 70 and control proceeds to step S 16 where exposure operations, as described in detail below, are performed.

The exposure operations begin when a signal is output via the drive circuit 74 which corresponds to the amount of lens movement stored in memory. The lens optics 32 (FIG. 2) are driven by motor 82, according to the signal from the drive circuit 74, to a position at which the subject is in focus. When movement control of the lens optics of system 32 by the drive circuit 74 has ended, signals are output via the drive circuit 74 corresponding to the shutter speed and stop value. The drive circuit 74 provides signals which control the opening and closing of the shutter 76 according to shutter speed, and control the stop of the stop member 78. After setting of the stop and the opening and closing of the shutter are completed, an instruction signal is output from drive circuit 74 to the motor 80 instructing the motor to rotate in order to advance the film by one frame. Following step S16, the control routine ends.

In step S2, when it is determined that auxiliary light is not required when the level of rangefinding signals from the focus detection element 88 is greater than a predetermined level, or in step S3, when it is determined that the light receiving sensor 44 is storing, control proceeds to step S10. In step S10, a signal instructing the illuminating lamp 84 not to illuminate with auxiliary light is sent via contact points 92 and 58 to the CPU 50 in the viewfinder 12. Proceeding to step S11, a film sensitivity signal is sent to the viewfinder 12 and the CPU 50 in the viewfinder 12 performs photometry, as described below, and calculates the suitable photographic conditions using the photometric output value and the film sensitivity signal. After the film sensitivity signal has been output to the viewfinder, control proceeds to step S12 and the distance to the subject 100 is measured by means of the output of the focus detection element 88 which has received light from the subject 100. The amount of movement required to move the lens optics of system 32 to the focussed position is detected, and this amount of movement is stored in memory.

Continuing in step S13, after the amount of movement required for the lens optics of system 32 is stored, control waits until a signal indicating suitable photographic conditions have been received from the viewfinder 12. When the signal is received, control proceeds to step S14 and the operations described above are performed in step S14 through step S 16. The process shown in the flowchart in FIG. 8 is repeatedly carried out while power is supplied to the camera.

Figure 9:
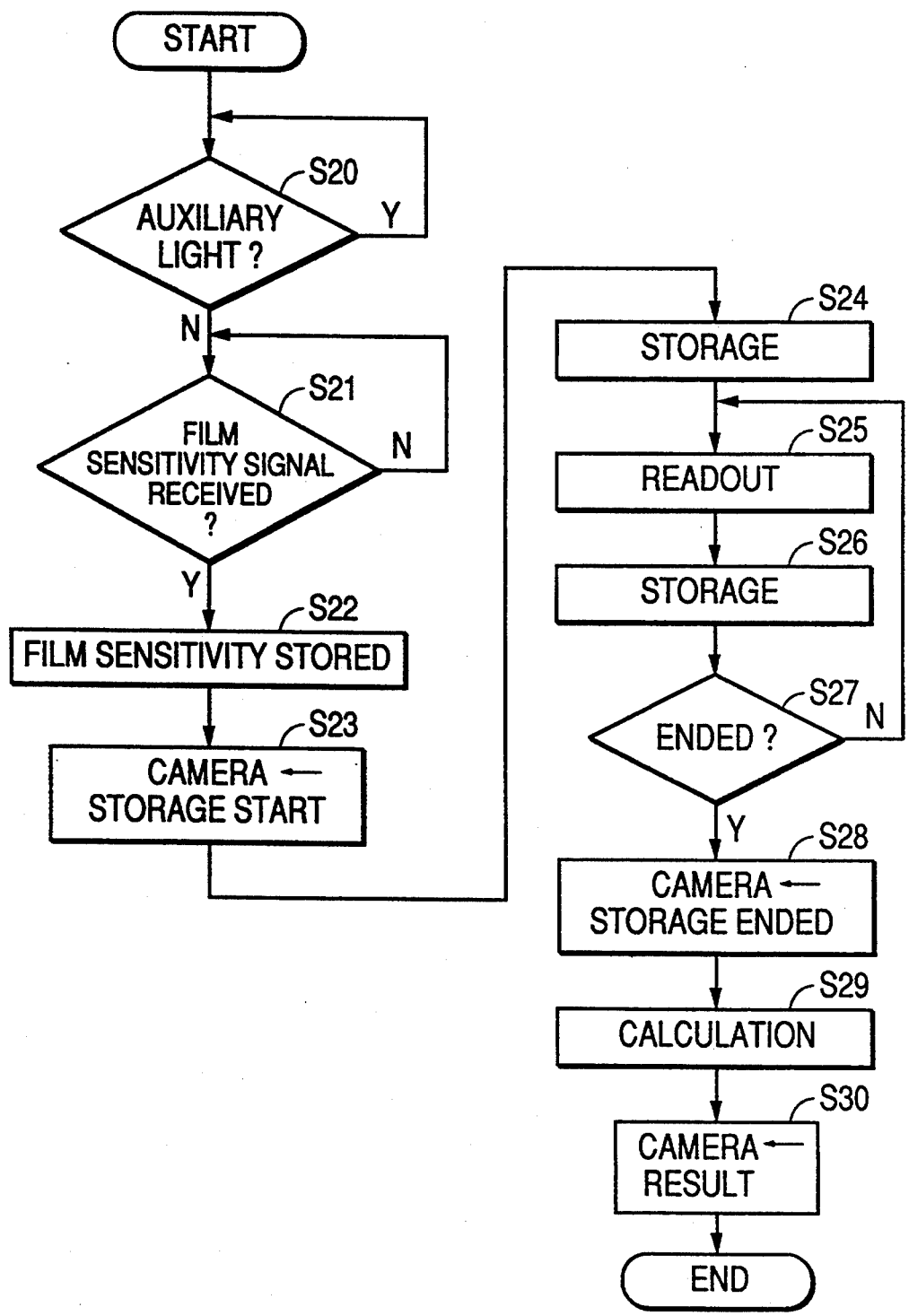
FIG. 9 is a flowchart showing an example of a control routine for controlling exposure in a camera having auxiliary lighting of a subject in accordance with the first embodiment of the present invention.

FIG. 9 is a flowchart showing an example of a control routine for controlling exposure in a camera having auxiliary lighting of a subject. The control routine is executed by the CPU 50 in the viewfinder 12. Initially, by starting the DC-DC converter 66 (FIG. 5), the battery 64 supplies current to the CPU 72 and power is supplied to the CPU 50 of the viewfinder 12 via contact points 90 and 56 thereby starting the control routine shown in FIG. 9.

In step S20, the CPU 50 waits until it receives a signal from the CPU 72 in the camera body 10 indicating whether or not auxiliary light is required. As described with respect to step S4 in FIG. 8, when a signal is received indicating that illumination by the illumination lamp 84 has been instructed, photometry is not performed, and step S21 and the processes thereafter are not carried out at this time. Further, as described with respect to step S8 or step S10 in FIG. 8, when a signal is received from the camera body 10 indicating that illumination by the auxiliary light 84 has not been instructed, control proceeds to step S21 and the control routine waits until a film sensitivity signal is received.

When the film sensitivity signal is received in a manner corresponding to step S9 or step S11 in FIG. 8, control proceeds to step S22 and the film sensitivity signal is stored in memory circuit 54. Continuing in step S23 a storage commencement instruction is transmitted to the CPU 72 of the camera body 10 via contact points 60 and 94. Next, in step S24, a storage instruction signal is output via the drive circuit 52 (FIG. 4) to the light receiving sensor 44. The respective photometric regions of the light receiving sensor 44 store electric charge supplied by the output signals from drive circuit 52. In step S25, the light receiving sensor 44 outputs the stored electric charge as electrical signals serially to the CPU 50, and the CPU 50 converts the serially received electrical signals to digital signals. Proceeding to step S26, the digital signals are stored in the memory circuit 54.

Next, in step S27, it is determined whether storage in the memory circuit 54 has been completed for all the signals corresponding to the divided regions of the light receiving sensor 44. When storage has not been completed, the program returns to step S25, and read out and storage are continued. However, when storage is complete, control proceeds to step S28 and an instruction that the storage operation for the viewfinder 12 has ended is sent to the CPU 72 in the camera body 10. Continuing in step S29, the signals previously stored in the memory circuit 54 (i.e., film sensitivity and signals from respective photometric regions of light receiving sensor 44) are read out, and calculations are performed according to a predetermined algorithm whereby suitable photographic conditions (e.g., stop value and shutter speed) are calculated. Next, in step S30, a signal representing the suitable photographic conditions is sent via contact points 60 and 94 to CPU 72 in the camera body 10, whereupon the control routine ends. The control process of FIG. 9 is continuously repeated while power is supplied to the camera.

As described above, when a signal is sent to CPU 72 indicating that suitable photographic conditions have been received, the CPU 72 performs operations corresponding to step S14 and the following steps as described with respect to the flowchart of FIG. 8. Thus, according to the preferred embodiment of the present invention, when a photographic subject is illuminated in order to assist rangefinding, a signal is sent to the CPU 72 of the camera body 10 which instructs illumination by the illuminating light 84. The signal is also received by the CPU 50 of the viewfinder 12, which prevents photometry from being performed. And, correspondingly, when photometry is being performed, the CPU 72 of the camera body 10 does not light the illuminating lamp 84, and, therefore, there is no illumination with auxiliary light and photometry is thus unaffected.

Although the first embodiment of the present invention has been described with respect to an auxiliary light providing illumination in order to assist rangefinding, the present invention also has application in the prevention of red-eye phenomenon due to a strobe light. Specifically, in order prevent the red-eye phenomenon when the auxiliary light shines in the eyes of the subject, photometry is prevented from being performed. However, during photometry, in a manner similar to that described above, illumination by the auxiliary light is preferably not performed.

Figure 10:
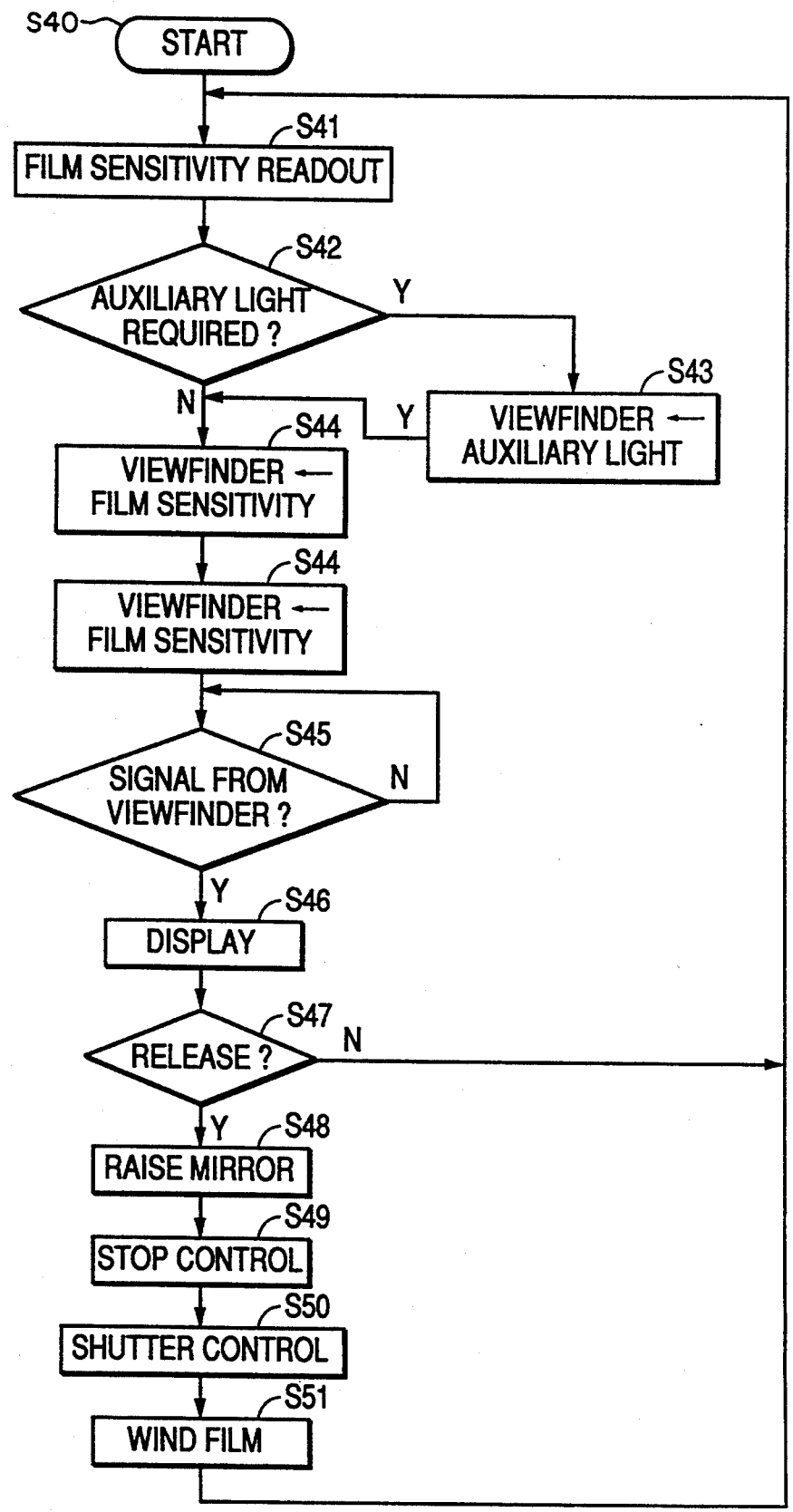
FIG. 10 is a flowchart showing an example of a control routine for controlling exposure in a camera having auxiliary lighting of a subject in accordance with a second embodiment of the present invention.

FIG. 10 is a flowchart showing an example of a control routine executed by CPU 72 within the camera body 10 in accordance with a second embodiment of the present invention. The control routine shown in FIG. 10 begins in step S40 when power is supplied to CPU 72 after the DC-DC converter 66 is started and is repeatedly performed while power is supplied to CPU 72. In step S41, the film sensitivity, relating to the loaded or set film sensitivity, is detected from the film sensitivity circuit 68. Next, in step S42, it is determined whether it is necessary to light the illuminating lamp 84 to provide auxiliary light to assist rangefinding. The determination performed in step S42 is made, for example, in a manner similar to that described above according to whether or not the level of a rangefinding signal from the focus detection element 88 is greater than a predetermined value. When it has been determined that it is necessary to provide auxiliary light from the illuminating lamp 84, control proceeds to step S43 and a signal is provided via drive circuit 74 to light the illuminating lamp 84. Further, data communication with the viewfinder 12 is carried out, and the instruction to provide auxiliary illumination is sent to the view finder.

Continuing in step S44, the film sensitivity which was read out in step S41 is sent to the viewfinder 12. A calculation to determine suitable exposure conditions is carried out using the film sensitivity signal and photometric signals from the light receiving sensor 44, and the result is sent to the camera body 10. Next, in step S45, a signal indicating that suitable exposure conditions have been determined is awaited from the viewfinder 12. When the appropriate exposure signal is received from the viewfinder 12, control proceeds to step S46, and the appropriate exposure values, for example, the shutter time and the stop value are displayed on the display 20 (FIG. 1).

Continuing in step S47, it is determined whether or not the action of exposure has been instructed by depressing the shutter button 18 (FIG. 1) (i.e., whether a release operation has been performed). If it is determined that exposure has not been instructed, control returns to step S41 and the steps thereafter are repeated. However, if it is determined that the exposure action has been instructed in step S47, control proceeds to step S48, and the mirror 34 (FIG. 2) is raised and removed from the light path of the reflected light from the photographic subject. Next, in step S49, based on the exposure signal, the stop 78 (FIG. 5) and the lens optics of system 32 are controlled according to the exposure signal. In step S50, the shutter 76 is opened for a period of time based upon the suitable exposure conditions, and in step S51, the motor 80 for winding film is rotated and the film is wound one frame. Control then returns to step S41 for the next exposure and the above-described process is repetitively performed. In the above-described process, when the illuminating lamp 84 is lighted, the circuits in the camera body 10 communicate their instruction signal only to the viewfinder 12.

Figure 11:
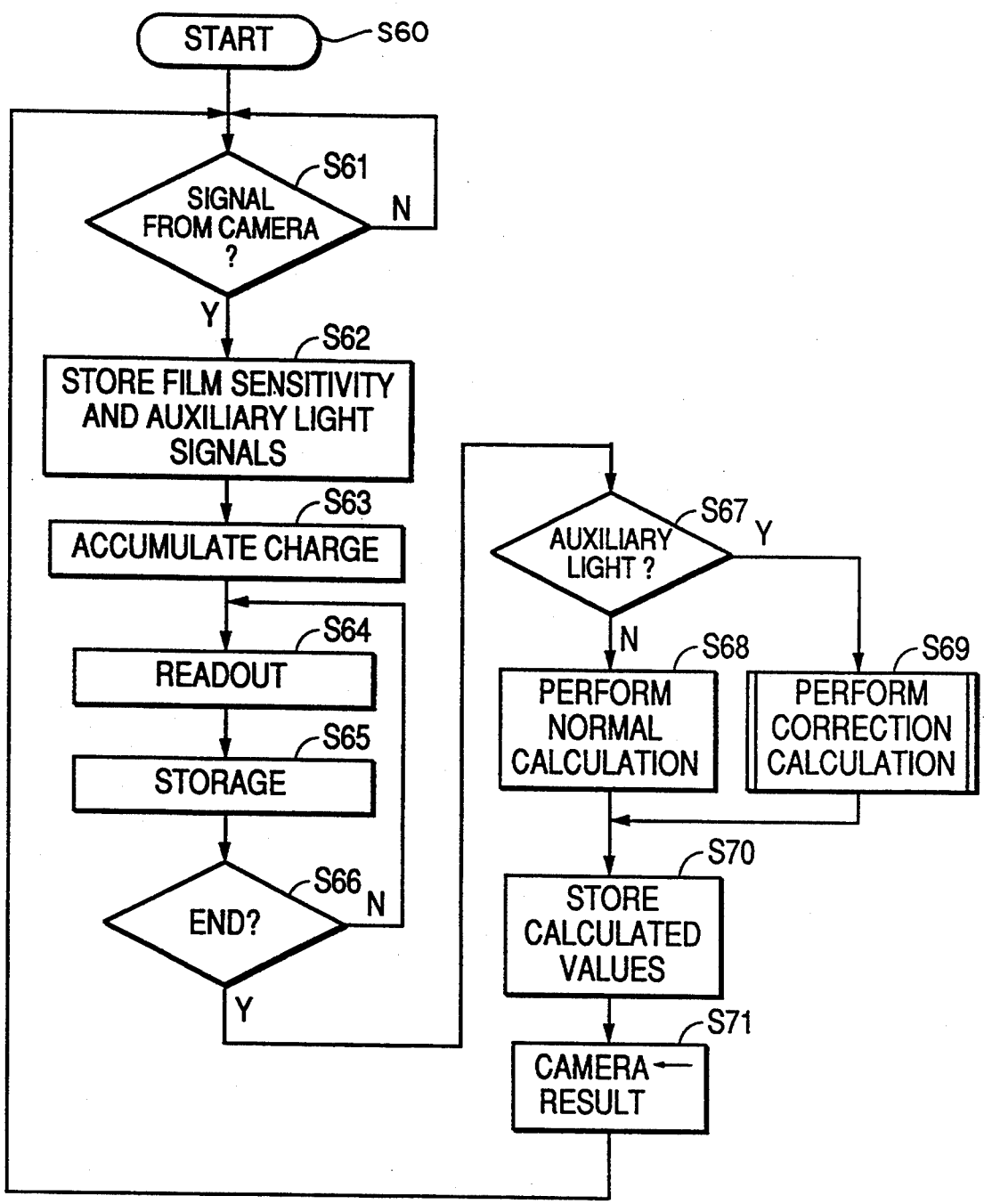
FIG. 11 is flowchart showing an example of a control routine for performing auxiliary lighting of a subject in accordance with the second embodiment of the present invention.

FIG. 11 is a flowchart showing an example of a control routine executed by the CPU 50 within the viewfinder 12 in accordance with the second embodiment of the present invention. The control routine shown in FIG. 11 begins in step S60 when the DC-DC converter 66 is started and the CPU 50 is supplied power via contact point 56. The control routine is repetitively performed while CPU 50 has electric power supplied to it.

In step S61, the control routine waits for communication of data from the camera body 10. The communication of data which is awaited corresponds to steps S43 and S44 of the process illustrated by the flowchart of FIG. 10. Specifically, the input of a film sensitivity signal (step S44 of FIG. 10) and a signal relating to the presence or absence of auxiliary illumination (step S43 of FIG. 10) are waited for. Next, in step S62, when the film sensitivity signal and the signal relating to the presence or absence of auxiliary illumination have been received in step S61, these signals are stored in the memory 54. Continuing in step S63, the light receiving sensor 44 accumulates electric charge representing a subject image via signals from the drive circuit 52. Plural light receiving elements in the sensor 44 act to accumulate, e.g., in internal minute capacitive elements, the electric charge generated by means of the subject light received by respective plural light receiving elements. Proceeding to step S64, the charge signals within the sensor 44 are read serially by the drive circuit 52, and are then input to the input terminal of an A/D converter of the CPU 50. In step S65, the read out charge signals (which correspond to the subject image signals) are converted by the A/D converter into a time series of digital signals, and are stored in an area D1 of the memory circuit 54. The area D1 is an area where the latest subject image signals are stored. In step S66, it is determined whether all of the signals from each of the regions of the sensor 44 have been received and stored in the memory 54 during one cycle of storage action. If it is determined that all of the signals of the divided regions of the sensor have not been stored, steps S64 and S65 reiterate until the determination in step S66 is affirmative.

When it has been determined in step S66, that all the signals of the divided regions have been stored, control proceeds to step S67 where it is determined, based upon the data stored in the memory 54 during step S62, whether or not the light receiving action by the light receiving sensor 44 was carried out based upon illumination by auxiliary light. When it has been determined in step S67 that the light receiving action was performed with no auxiliary light, control proceeds to step S68 and a calculation of appropriate exposure conditions is performed according to a predetermined algorithm corresponding to the light receiving process performed with no auxiliary light.

However, when it has been determined in step S67 that the light receiving action by light receiving sensor 44 has been carried out with the illuminating lamp 84 providing auxiliary light, control proceeds to step S69 where a correction calculation process is performed (as will be described in detail below with reference to FIG. 12). When the calculation process of step S68 or step S69 has ended, control proceeds to step S70 where the values calculated in step S68 or step S69, corresponding to the appropriate exposure conditions, is stored in the memory 54. In step S71, the information indicating the appropriate exposure conditions in memory 54 is sent to the camera body 10 (this step corresponds to step S43 in FIG. 10).

Figure 12:
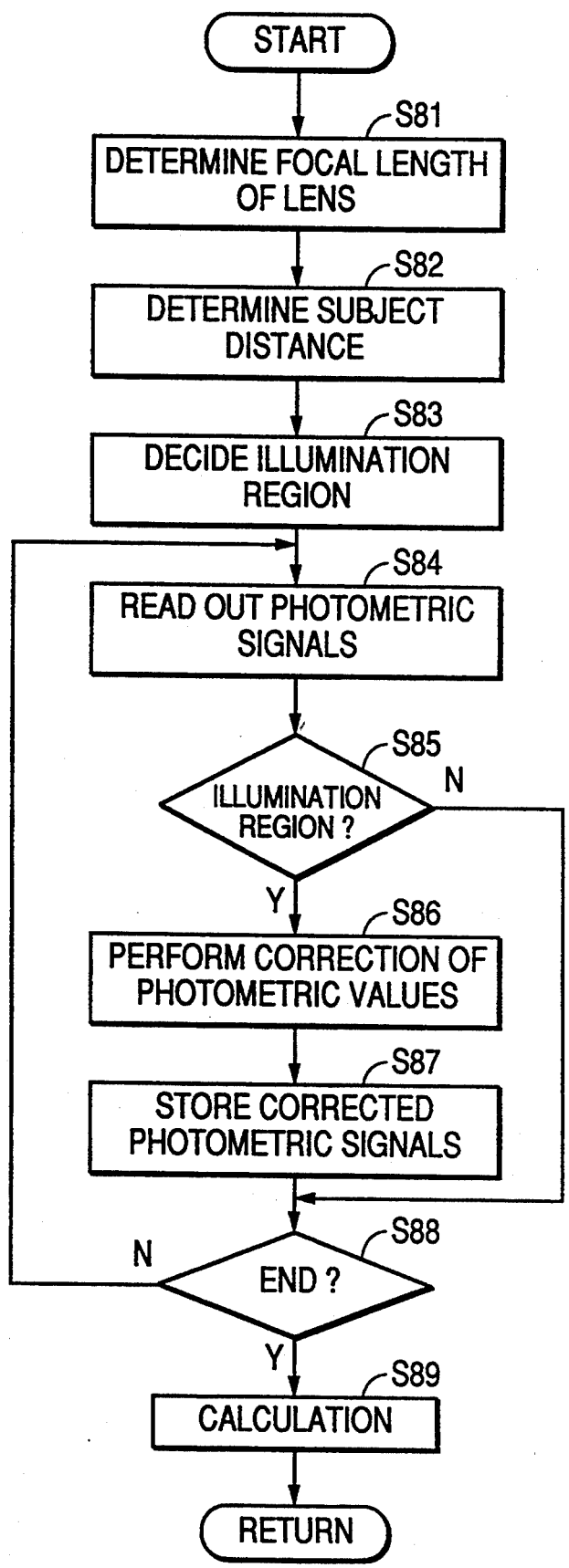
FIG. 12 is flowchart showing an example of a control routine for performing a correction calculation in accordance with the second embodiment of the present invention.

FIG. 12 is a flowchart showing an example of a process for performing correction calculation corresponding to step S69 in FIG. 11. First, in step S81, the focal length of the lens is determined. The focal length of the lens can be determined, for example, in the case in which the lens is a zoom lens by means of signals from an encoder disposed on the lens. Next, in step S82, the subject distance is determined from signals from a rangefinder device disposed in the camera. In step S83, an illumination region is determined in which signal correction is to be performed, taking into account the focal length of the lens and the distance of the subject. This is because the size of the illumination regions change in the photographic field according to the zoom ratio of the lens, and according to the focal length of the lens and according to the distance of the subject. The information for determining these illumination regions, e.g., the focal length of the lens and the distance of the subject, are previously stored in memory, for example as a ROM table, and the coordinates of the picture elements or the number of the picture elements contained in the illumination regions may be stored in memory at positions corresponding to the focal length and distance of the subject.

Continuing, in step S84, the photometric signals corresponding to each picture element stored in the region D 1 within the memory 54 are read out. Next, in step S85, it is determined whether or not the photometric region corresponding to the signal which was read out from D 1 is contained in the illumination region. When it is determined that the photometric region corresponding to the signal which was read out is not contained in the illumination region, control proceeds to step S88.

However, when the photometric region corresponding to the signal which was read out is contained in the illumination region, in step S86, correction is performed by multiplying the photometric values which were read out by a predetermined reduction factor $\alpha$. In step S87, the photometric signal values after correction are again stored in the memory 54. Proceeding to step S88, a determination is made as to whether the process of step S84 through step S87 has been performed for all picture elements. If step S88 is negative, control returns to step S84, and step S84 through step S87 are performed until the process has been performed for all picture elements. When the determination in step S88 is affirmative, proceeding to step S89, a calculation of appropriate exposure conditions is performed using the photometric values after correction which are stored in the memory 54. After the appropriate exposure conditions have been calculated, control returns to step S69 in FIG. 11.

According to the process shown in FIG. 11, after correction to the photometric signal in the illumination areas has been performed, appropriate exposure values are then calculated according to an algorithm. However, for example, the photometric signal values in the illumination regions may be replaced by an average value of all the photometric signal values, and appropriate exposure values are then calculated using the same algorithm as above. Further, ignoring the photometric signals output in the illumination regions, the appropriate exposure values can be determined using photometric signals in regions outside the illumination regions.

In the process illustrated in FIG. 12, the reduction factor $\alpha$ for the photometric signals in the illuminated regions was assumed to be fixed. However, it is possible to change the reduction factor $\alpha$, for example, according to the distance to the subject. This is possible because the influence of the auxiliary light becomes smaller as the distance to the subject becomes larger. Furthermore, although the second embodiment has been described with respect to the use of an illuminating lamp to provide auxiliary light to assist the operation of a focus detection element in low brightness, wherein the auxiliary light has an effect on photometric action, the present invention is not so limited. For example, the second embodiment may also be applied similarly to the case of performing a correction process for the effect of auxiliary light supplied by means of an auxiliary light source which is used in order to prevent the red-eye phenomenon.

Therefore, according to the second embodiment of the present invention, in a camera equipped with an illumination lamp to provide auxiliary light to a portion of a subject, and a light receiving sensor divided into plural regions for performing photometry on a subject image, when the illuminating light is shined on the subject during the photometric action of the light receiving sensor, a correction is performed for specific portion of the photometric signal and it becomes possible to obtain an appropriate exposure signal which is unaffected by the auxiliary light due to the illumination lamp.

Although a few preferred embodiments of the invention have been shown and described, it will be appreciated by those skilled in the art that changes may be made in these embodiments, without departing from the principles and the spirit of the invention, the scope of which is defined in the appended claims and their equivalents.

What is claimed is:

1. A camera provided with a photometric device, comprising: a light receiving sensor to perform photometric measurement in plural regions of a subject image;

an illumination source to illuminate a portion of the subject;

a detection device to detect whether the light receiving sensor is performing photometric measurement; and a control unit to control the illumination source, based upon a detection made by the detection device, to eliminate influence of the illumination source on the photometric measurement.

2. A camera provided with a photometric device, comprising:
 a light receiving sensor to perform photometric measurement in plural regions of a subject image;
 an illumination source to illuminate a portion of the subject;
 a detection device to detect whether the light receiving sensor is performing photometric measurement; and
 a control unit to control the illumination source based upon a detection made by the detection device, wherein the control unit inhibits illumination by the illumination source when the detection device detects that the light receiving sensor is performing photometric measurement.

3. The photometric device, as recited in claim 2, wherein the light receiving sensor is divided into a plurality of segments.

4. A camera provided with a photometric device, comprising:
 a light receiving sensor to perform photometric measurement in plural regions of a subject image;
 an illumination source to illuminate a portion of a subject;
 a detection device to detect whether the illumination source is illuminating a portion of the subject; and
 a control unit to control the light receiving sensor, based upon a detection made by the detection device, to eliminate influence of the illumination source on the photometric measurement by the light receiving sensor.

5. A camera provided with a photometric device, comprising:
 a light receiving sensor to perform photometric measurement in plural regions of a subject image;
 an illumination source to illuminate a portion of a subject;
 a detection device to detect whether the illumination source is illuminating a portion of the subject; and
 a control unit to control the light receiving sensor based upon a detection made by the detection device, wherein the control unit inhibits the light receiving sensor from performing photometric measurement when the detection device detects that the illumination source is illuminating a portion of the subject.

6. The photometric device, as recited in claim 5, wherein the light receiving sensor is divided into a plurality of segments.

7. A camera provided with a photometric device, comprising:
 a light receiving sensor to perform photometric measurement in plural regions of a subject image;
 an illumination source to illuminate a portion of a subject;
 a detection device to detect whether the illumination source is illuminating the subject while the photometric measurement is being performed; and
 a correction unit to correct a photometric output of the light receiving sensor when the detection device has detected illumination of the subject during a photometric measurement.

8. The photometric device, as recited in claim 7, wherein the light receiving sensor is divided into a plurality of segments.

9. The photometric device, as recited in claim 7, wherein the illumination source is an auxiliary light generating source used to facilitate focus detection.

10. The photometric device, as recited in claim 7, wherein the illumination source is an auxiliary light generating source which generates light to prevent red-eye.

11. The photometric device, as recited in claim 7, wherein the correction unit performs correction according to the distance of the subject from the camera.

12. The photometric device, as recited in claim 11, wherein at least one of a region in which correction is performed and an amount of correction change according to the distance of the subject to the camera.

13. The photometric device, as recited in claim 7, wherein the correction unit performs correction according to a zoom ratio of a photographic lens in the camera.

14. The photometric device, as recited in claim 13, wherein at least one of a region in which correction is performed and an amount of correction change according to the zoom ratio of the photographic lens in the camera.

15. A camera provided with a photometric device, comprising:
 a light receiving sensor;
 an illumination source;
 a detection device to detect whether the light receiving sensor and the illumination source operate at the same time; and
 a control unit to control the camera to prevent the illumination from the illumination source from affecting the photometric measurement by the light receiving sensor when the detection device detects that the light receiving sensor and the illumination source operate at the same time.

* * * * *